United States Patent Office 3,491,097
Patented Jan. 20, 1970

3,491,097
3-(PIPERAZINOALKYL)-PYRAZOLES
Volker Koppe, Karl Schulte, Siegmund Sommer, and Helmut Muller-Calgan, Darmstadt, Germany, assignors to E. Merck A.G., Darmstadt, Germany
No Drawing. Filed June 20, 1967, Ser. No. 647,311
Claims priority, application Germany, July 2, 1966, M 70,083
Int. Cl. C07d 57/00; A61k 27/00
U.S. Cl. 260—268                                            5 Claims

ABSTRACT OF THE DISCLOSURE

As CNS depressants, particularly as narcosis potentiating agents, a compound selected from the group consisting of a 3-(piperazinoalkyl)-pyrazole of the following formula and the physiologically acceptable acid addition salts thereof:

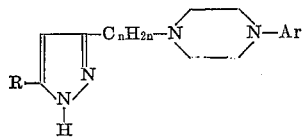

wherein

R is H or alkyl of 1–4 carbon atoms;
Ar is unsubstituted phenyl, or phenyl substituted by at least one member selected from the group consisting of alkyl of 1–4 carbon atoms, alkoxy of 1–4 carbon atoms, trifluoromethyl, and halogen;
n is an integer of 1 to 4 inclusive.

---

Applicants hereby claim the benefit of the filing date of West German patent application M 70,083 IVd/12p of July 2, 1966.

This invention relates to azoles, in particular to pyrazoles and, more particularly, to 3-(piperazinoalkyl)-pyrazoles.

An object of one aspect of this invention is to provide novel chemical compounds and processes for producing same.

According to an object of another aspect of this invention, there are provided novel pharmaceutical compositions.

According to an object of still another aspect of this invention, there are provided methods of administering compounds to mammals to effect therapeutic activities and the like.

Upon further study of the specification and claims, other objects and advantages of the present invention will become apparent.

To attain the objects of this invention, there are provided 3-(piperazinoalkyl)-pyrazoles of the following Formula I, as well as the acid addition salts thereof:

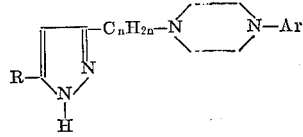

wherein

R represents H or alkyl of 1–4 carbon atoms;
Ar represents phenyl, optionally mono- or polysubstituted by alkyl and/or alkoxy of respectively 1–4 carbon atoms, trifluoromethyl, and/or halogen; and
n is 1 to 4, inclusive.

The substances are physiologically compatible and exhibit remarkable depressant effects on the mammalian central nervous system. For example, substantial narcosis-prolonging, narcosis-potentiating, tranquilizing, and neuroleptic activities are evident. Furthermore, there are also observed blood pressure lowering, noradrenaline- or adrenaline-potentiating or stimulating activities, for example thymoanaleptic and tetrabenazine-antagonistic properties. Still further, there are observed antihistaminic and bronchospasmolytic activities.

As an indication of the pharmacological efficaciousness of the compounds of this invention, narcosis-potentiating tests on rats were conducted substantially in accordance with the method of Janssen et al. (J. Med. Pharm. Chem. 1, 281–297 [1959]). Using sub-narcotic dosages (dosages below the threshold of narcosis response) of 7.5 mg./kg. sodium hexobarbital (administered intravenously), the following $ED_{50}$ values were obtained:

| Substance | Period of exposure (minutes) | $ED_{50}$ (subcutaneously, mg./kg.; in parentheses: 95% reliable limits) |
|---|---|---|
| 3-[2-(N'-m-chlorophenyl-piperazino)-ethyl]-5-methyl-pyrazole | 30 | 1.5 (1.2–1.9) |
| 3-[2-(N'-m-tolyl-piperazino)-ethyl]-5-methyl-pyrazole | 30 | 3.4 (2.7–4.2) |
| Chlorpromazine | 30 | 6.1 (5.3–7.1) |
| Comparative commercial compound | 60 | 7.0 (6.2–7.9) |

In view of the above results, it appears that the compounds of this invention, at approximately a 4-fold to 2-fold lower dosage, are equally efficacious narcosis-potentiating agents as the commercial compound chlorpromazine.

For the production of the 3-(piperazinoalkyl)-pyrazoles of Formula I, as well as the acid addition salts thereof, several alternative processes can be employed, such as:

(a) A compound of Formula II

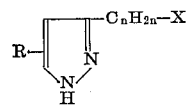   II wherein

X represents on OH-group or a reactive ester thereof, is reacted with a compound of Formula III

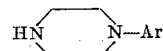   III or (b) A compound of Formula IV

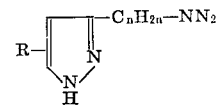   IV is reacted with a compound of Formula V

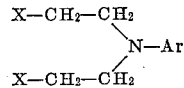   V wherein the two groups X can together also represent an oxygen atom;

or (c) A compound of Formula VI

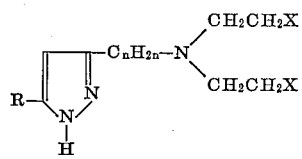

VI wherein the two groups X can together also represent an oxygen atom, is reacted with a compound of Formula VII $$H_2N\text{—}Ar \qquad (VII)$$

or (d) A compound of Formula VIII

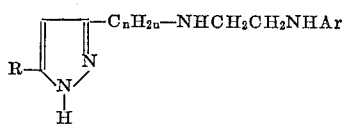

VIII is reacted with a compound of Formula IX $$X\text{—}CH_2CH_2\text{—}X \qquad (IX)$$

or (e) A compound of Formula X

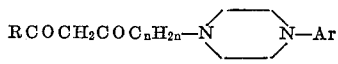

X is reacted with hydrazine;

or (f) A compound of Formula I containing additionally one or more groups which can be substituted by hydrogen, and/or one or more carbon-to-carbon unsaturated bonds, is treated with agents capable of emitting hydrogen; or (g) A compound of Formula I is converted, by treatment with an acid, into a physiologically acceptable acid addition salt; or (h) A base of Formula I is liberated from the acid addition salt thereof.

In Formulae II to X, the designations R, Ar, $n$, and X have the previously indicated meanings.

Suitable alkyl groups in the residues R and Ar are: methyl, ethyl, n-propyl, isopropyl, n-butyl, isobutyl, sec.-butyl, and tert.-butyl.

The residue Ar is preferably phenyl, o-, m-, or p-tolyl, 2,4-dimethylphenyl, o-, m-, or p-ethylphenyl, p-isopropylphenyl, 2-methyl-5-isopropylphenyl, o-, m-, or p-methoxyphenyl, 3,4 - dimethoxyphenyl, 3,4,5 - trimethoxyphenyl, 2-methoxy-5-methylphenyl, o-, m-, or p-ethoxyphenyl, o-, m-, or p-trifluoromethylphenyl, o-, m-, or p-fluorophenyl, o-, m-, or p-chlorophenyl, 2,3-, 2,4-, 2,5-, 2,6-, 3,4-, or 3,5 - dichlorophenyl, 2,4,6 - trichlorophenyl, o-, m-, or p-bromophenyl, 2,4-dibromophenyl, or o-, m-, or p-iodophenyl.

The group —$C_nH_{2n}$— preferably represents

—$(CH_2)_n$— such as —$CH_2$—, —$CH_2CH_2$—, —$CH_2CH_2CH_2$—, or

—$CH_2CH_2CH_2CH_2$— and can further more be: —$CH(CH_3)$—,

—$CH(CH_3)CH_2$—, —$CH_2CH(CH_3)$—, —$CH(C_2H_5)$—
—$CH(CH_3)CH_2CH_2$—, $CH_2CH(CH_3)CH_2$—
—$CH_2CH_2CH(CH_3)$—, —$CH(C_2H_5)CH_2$—
—$CH_2CH(C_2H_5)$—, —$CH(n\text{-}C_3H_7)$—, or
—$CH(iso\text{-}C_3H_7)$—

In the definition of X, reactive esters of OH-groups are such esters having groups which can be replaced during the reaction by an amine, or by an amino group. Such replaceable groups are preferably acyloxy, such as acetoxy; methanesulfonyloxy, or p-toluenesulfonyloxy; and Cl, Br, or I. It is also possible to conduct the process under reducing conditions with starting compounds corresponding to Formulae II, V, VI, or IX, but containing, in place of one or two $CH_2X$-residues, groups of higher oxidation stages reducible to $CH_2OH$-groups. Such groups of high oxidation stages include, for example, aldehydes and esters.

"Groups substitutable by hydrogen" are to be understood as halogen, carbonyl, hydroxy, and benzyl groups, with the preferred group being halogen, especially chlorine or bromine atoms.

The compounds of Formula I are preferably obtainable by reacting 3-(haloalkyl)-pyrazoles or the analogs thereof of Formula II with 1-substituted piperazines of Formula III.

Starting compounds of Formula II are preferably the following pyrazoles: 3 - chloromethyl-, 3 - bromomethyl-, 3-iodomethyl-, 3-hydroxymethyl-, 3 - (1 - chloroethyl)-, 3 - (1 -bromoethyl)-, 3 - (1 - iodoethyl)-, 3 - (1-hydroxyethyl)-, 3-(2-chloroethyl)-, 3-(2-bromoethyl)-, 3-(2-iodoethyl)-, 3-(2-hydroxyethyl)-, 3-(3-chloropropyl)-, 3 - (3-bromopropyl)-, 3-(3-iodopropyl)-, 3-(3-hydroxypropyl)-, 3-(4-chlorobutyl)-, 3-(4-bromobutyl)-, 3-(4-iodobutyl)-, and 3-(4-hydroxybutyl)-pyrazoles. Further starting compounds are the 5-methyl, 5-ethyl, 5-n-propyl, 5-isopropyl, and 5-n-butyl derivatives of the above-mentioned compounds, as well as the esters, particularly the methane- and p-toluenesulfonates, of the aforementioned hydroxy compounds.

Of the compounds of Formula III, the following piperazines are preferably used: N-phenyl, N-o-tolyl-, N-m-tolyl-, N-p-tolyl-, N-p-ethylphenyl-, N - o - methoxyphenyl-, N-m-methoxyphenyl-, N-p-methoxyphenyl-, N-o-trifluoromethylphenyl-, N-m-trifluoromethylphenyl-, N-p-trifluoromethylphenyl-, N-o-fluorophenyl-, N - m - fluorophenyl-, N-p-fluorophenyl-, N-o-chlorophenyl, N-m-chlorophenyl-, N-p-chlorophenyl-, N-o-bromophenyl-, N - m - bromophenyl-, N-p-bromophenyl-, N-o-iodophenyl-, N-m-iodophenyl-, and N-p-iodophenyl-piperazine.

The compounds of Formulae II and III are either known, or they can readily be produced analogously to known compounds. For example, pyrazole-3-carboxylic acid esters can be reduced catalytically or with lithium aluminum hydride to 3-hydroxymethyl-pyrazoles. The 2-hydroxy-4-pyrones can be reacted with hydrazine to form pyrazole-3-acetic acid hydrazides; by subjecting the latter compounds to alcoholysis, the corresponding esters are obtained, and by reducing these esters, 3-(2-hydroxyethyl)-pyrazoles are produced. The 3-(3-hydroxypropyl)- or 3-(4-hydroxybutyl)-pyrazoles (II, X=OH, $n$=3 or 4) can be obtained by condensing carbonyl compounds of the formula R—CO—$CH_3$ with $\gamma$-butyrolactone or $\delta$-valerolactone, respectively, to 2-hydroxy-2-acylmethyltetrahydrofurans or -pyrans, and then subsequent reaction with hydrazine.

The corresponding halogen compounds (II, X=Cl, Br, or I) are obtained from the alcohols with, for example, thionyl chloride, or hydrobromic or hydriodic acid. The corresponding acylates and sulfonic acid esters result from a conventional esterification process, e.g., with acid anhydrides or halogenides, such as acetic anhydride, or methane- or p-toluenesulfonyl chloride. The piperazines of Formula III can be obtained by reacting amines of Formula VII with diethanolamine, morpholine, or bis-(2-chloroethyl)-amine, or also from piperazine and halogenides, preferably bromides, of the formula ArX.

The reaction of compounds II and III is conducted according to conventional methods disclosed in the literature for the alkylation of amines. The process is carried out in the absence of solvents by melting the components together, if desired, in a sealed tube or in an autoclave, or also in the presence of an inert solvent, such as benzene, toluene, xylene, ketones, such as acetone or butanone, or alcohols, such as methanol, ethanol, tetrahydrofuran, or dioxane. Mixtures of solvents can be employed with one another, or with water. It is also advantageous to add an acid-binding agent, for example a hydroxide, carbonate, bicarbonate, or another salt of a weak acid of the alkali or alkaline earth metals, preferably those of sodium, potassium, or calcium; an organic base, such as triethylamine, dimethylaniline, pyridine, or quinoline; or an excess of the piperazine derivative of Formula III. The reaction time ranges, depending upon the conditions employed, between a few minutes and 14 days; the reaction temperature is generally between 0 and 200° C., preferably between 100 and 130° C. If the reaction is conducted without solvents at about 120° C., the reaction is terminated within about ½ to 2 hours. When using solvents, heating for 12–24 hours is sometimes necessary in order to obtain good yields.

In a modification of the above-mentioned method, an aldehyde of Formula XI

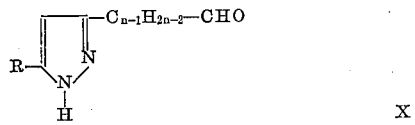

X can be reacted with piperazines of Formula III under the conditions of a catalytic hydrogenation. The reaction conditions correspond to those known from the literature for reductive alkylations. The aldehydes of Formula XI are obtainable by oxidizing the corresponding primary alcohols of Formula II (X=OH).

The compounds of Formula I can also be produced by reacting a 3-(aminoalkyl)-pyrazole of Formula IV with a nitrogen-lewisite compound of Formula V.

The 3-(aminoalkyl)-pyrazoles can be obtained from the above-mentioned 3-(haloalkyl)-pyrazoles of Formula II by reacting same with ammonia or phthalimide-potassium. The following resultant compounds are particularly preferred: 3-aminomethyl-pyrazole, 3-(2-aminoethyl)-pyrazole, 3-(3-aminopropyl)-pyrazole, 3-(4-aminobutyl)-pyrazole, as well as the 5-methyl, 5-ethyl, 5-n-propyl, 5-isopropyl, and 5-n-butyl derivatives of these compounds.

The more important compounds of Formula V are: bis-(2-chloroethyl)-aniline, bis-(2-bromoethyl)-aniline, and N-phenyl-morpholine, as well as the derivatives thereof substituted in the aromatic nucleus analogously to the above-set forth piperazines of Formula III.

Conversely, for producing the compounds of Formula I, it is also possible to react nitrogen-lewisite compounds of Formula VI with amines of Formula VII under similar conditions. The compounds of Formula VI can be obtained, for example, by reacting the 3-haloalkyl-pyrazoles of Formula II (X=Cl, Br, I) with diethanolamine; alternatively, the amines of Formula IV can be reacted with ethylene chlorhydrin or with ethylene oxide, with subsequent conversion of the hydroxy groups into halogen atoms, for example, with thionyl chloride, with amines of Formula VII under similar conditions. Preferred compounds of Formula VI are, for example: 3-[bis-(2-chloroethyl)-aminomethyl]-pyrazole, 3-{2-[bis-(2-chloroethyl)-amino]-ethyl}-pyrazole, 3-{3-[bis-(2-chloroethyl)-amino]-propyl}-pyrazole, and 3-{4-[bis-(2-chloroethyl)-amino]-butyl}-pyrazole, as well as the 5-methyl, 5-ethyl, 5-n-propyl, 5-isopropyl, and 5-n-butyl derivatives thereof; the corresponding bis-(2-bromoethyl) compounds, and the 3-(morpholinoalkyl)-pyrazoles (readily produced from the 3-(haloalkyl)-pyrazoles and morpholine). Preferred compounds of Formula VII are aniline and the derivatives thereof substituted in the aromatic nucleus by methyl, ethyl, methoxy, trifluoromethyl, fluorine, chlorine, bromine, and/or iodine.

The compounds of Formula I can also be obtained by reacting the 3-(2-aminoethylaminoalkyl)-pyrazoles of Formula VIII substituted at the N' atom with ethylene dihalides of Formula IX, preferably ethylene chloride or ethylene bromide, or analogous compounds, such reactions being advantageously conducted in the presence of acid- neutralizing agents. The compounds of Formula VIII are produced by reacting an aldehyde of Formula XI with a substituted ethylene diamine derivative of the formula Ar—NHCH$_2$CH$_2$NH$_2$ to form the Schiff base and then catalytically hydrogenating the latter. As preferred examples of compounds of Formula VIII, the following are set forth: 3-(2-anilinoethylamino-methyl)-pyrazole, 3-[2-(2-anilinoethylamino)-ethyl]-pyrazole, 3-[3-(2-anilinoethylamino) - propyl] - pyrazole, 3 - [4 - (2 - anilinoethylamino)-butyl]-pyrazole, and the derivatives thereof substituted in the aromatic nucleus as indicated above, as well as the 5-methyl, 5-ethyl, 5-n-propyl, 5-isopropyl, and 5-n-butyl derivatives of these compounds.

The reactions of the compounds IV with V, or VI with VII are normally conducted under the above-described conditions in connection with the reaction of compounds II with III. In the reaction of VIII with IX, generally somewhat more vigorous conditions are employed; for example, the reaction mixture is heated, if desired, in the presence of a higher-boiling inert solvent and a strong base, such as sodium hydroxide or carbonte, for 6–8 hours, under stirring, to temperature between 120 and 160° C.

If the starting compound is an N-substituted morpholine, it is advantageous to heat the hydrochloride thereof, together with that of the 3-(aminoalkyl-pyrazole, at 230–240° C., with the water formed during the reaction being distilled off.

It is furthermore possible to react a 1,3-dicarbonyl compound of Formula X with hydrazine. The process is conducted in accordance with the conventional methods for forming pyrazoles from β-carbonyl compounds and hydrazines. Normally, the hydrazine is prepared in situ by mixing an aqueous or alcoholic solution of the sulfate or hydrochloride thereof with equivalent amounts of a sodium hydroxide or potassium hydroxide solution. Compound X is added to this solution dropwise, if desired, in an inert organic solvent, such as methanol, ethonal, tetrahydrofuran, or dioxane, and/or under cooling. The reaction is then terminated by allowing the reaction solution to stand, with or without stirring and heating of the reaction solution. The reaction is generally conducted at temperatures between 0° C. and the boiling point of the solvent employed and is terminated after a few minutes up to 10 hours.

The starting compounds of Formula X can be obtained, e.g., by reacting 1,3-dicarbonyl compounds, halogenated in the terminal position, such as 1-bromo- or 1-chloropentane-dione(2,4) with aryl piperazines of the Formula III. Starting compounds of Formula X are preferably the following: 1-(N'-phenylpiperazino)-pentane-dione-(2,4), -hexanedione-(2,4), -heptanedione-(2,4), octanedione-(2,4), -hexanedione-(3,5), -heptanedione-(3,5), octanedione-(3,5), -nonanedione-(3,5), -heptanedione-(4,6), -octanedione-(4,6), -octanedione-(5,7), and the derivatives thereof substituted in the aromatic nucleus, as previously indicated.

It is also possible to produce a compound of Formula I by starting with a preliminary product having the same basic structure, but which contains in addition one or several groups replaceable by hydrogen and/or C=C double bonds and/or C≡C triple bonds, and treating same with agents capable of emitting hydrogen.

For example, chlorine or bromine atoms on the aromatic nucleus, on the pyrazole nucleus, or on the alkylene chain can be substituted by hydrogen by catalytic hydrogenation or treatment with chemical reducing agents. Thus, it is possible to convert the 5-halogenopyrazoles by treatment with zinc and hydrochloric acid, or with phosphorus and hydrogen iodide into the halogen-free pyrazole derivatives. For example, 5-bromo-3-(N'-phneyl-piperazino methyl)-pyrazole (obtainable by reacting γ-(N'-phenylpiperazino)-acetoacetic acid ethyl ester with hydrazine and reacting the thus-obtained 3-(N'-phenylpiperazinomethyl)-pyrazolone-(5) with phosphorus oxybromide) can be reduced in this manner to 3-(N'-phenyl-piperazinomethyl)-pyrazole.

Further, it is possible, for example, to react 1-benzyl-3-formyl-pyrazoles with malonic acid in pyridine/piperidine to form pyrazolyl-(3)-acrylic acids which can, if desired, be hydrogenated to β-(pyrazolyl-3)-propionic acids. The acid chlorides of these acids can be converted, with 1-substituted piperazines of Formula III, into the corresponding acid amides, and the latter can be converted (after the benzyl group has been split off, see below), e.g., with $LiAlH_4$, into the compounds of Formula I. In this connection, an additional catalytic hydrogenation must be conducted in case of an acrylic acid derivative.

In the preparation of the substances of Formula I, there are sometimes advantageously employed intermediate products having, in the 1-position of the pyrazole ring, protecting groups removable by reduction (see above). Furthermore, by reacting 1-benzyl-3-(3-aminopropyl)-pyrazole with N,N-bis - (2-chloroethyl)-aniline, there is obtained, for example, the 1-benzyl-3-[3-(N'-phenylpiperazino)-propyl]-pyrazole, yielding with catalytically activated hydrogen, 3-[3 - (N'-phenylpiperazino)-propyl]-pyrazole. The benzyl group can also be split off by dissolving or suspending the benzyl compound in liquid ammonia and adding sodium in a small excess.

For catalytic hydrogenation reactions and/or hydrogenolyses, suitable catalysts are, e.g., noble metal, nickel, and cobalt catalysts, as well as copper-chromium oxide. The noble metal catalysts can be used on supports (for example, palladium on charcoal, calcium carbonate, or strontium carbonate), as oxide catalysts (for example, platinum oxide), or as finely distributed metal catalysts. Nickel and cobalt catalysts are suitably employed in the form of Raney metals, as well as being employed on kieselguhr or pumice as the support.

The hydrogenation can be conducted at room temperature and normal pressure, or also at elevated temperature and/or elevated pressure. Preferably, pressures between 1 and 100 atmospheres and temperatures between —80 and +150° C. are used. The reaction is advantageously conducted in the presence of a solvent, such as water, methanol, ethanol, isopropanol, tert.-butanol, ethyl acetate, tetrahydrofuran, or acetic acid.

For the hydrogenation reaction, the free bases, or also the corresponding salts, for example the hydrochlorides, can be employed. The hydrogenation conditions must be chosen so that the remaining reducible groups or systems present in the molecule, e.g., the pyrozole ring and the aromatic ring, are not likewise attacked.

Thus, in the hydrogenation of C=C double bonds and in the hydrogenolysis of benzyl groups, the process is carried out preferably under normal pressure in such a manner that the hydrogenation is interrupted after the stoichiometric amount of hydrogen has been absorbed.

Reduction reactions with chemical agents (such as those mentioned above, are conducted according to conventional methods which are described in the literature. For example, the reaction can be conducted with lithium aluminum hydride in ether, tetrahydrofuran, or di-n-butylether, preferably under reflux conditions. In this connection, it is sometimes advantageous to extract poorly soluble starting compounds continuously with the boiling solvent, in accordance with the Soxhlet method.

Further examples of chemical reduction involve dissolving the bromine-substituted pyrazoles in concentrated hydrochloric acid, adding a large excess of zinc, and heating the reaction mixture several hours to about 100° C. Likewise, chlorine atoms can be split off reductively, for example, by mixing the pyrazole compound with the same amount of phosphorus, adding about 4 parts of volume of 20% hydriodic acid, and heating the reaction mixture for approximately 10 hours in a tube to about 170–180° C. In all these processes, care must, of course, be taken lest simultaneously other groups which may be present react in an undesired manner with the reactant employed; for example, alkoxy groups can be split with hydrogen iodide.

The products of Formula I obtained in accordance with one of the aforementioned methods are isolated from the reaction mixtures in a conventional manner, for example, by extraction, and are purified by distillation, or crystallization of the bases or the salts thereof, particularly the hydrochlorides. Chromatographic methods can likewise be used for purposes of isolation and purification.

The compounds of Formula I can be conventionally converted into the acid addition salts thereof with an acid. For this reaction, such acids are suitable which yield physiologically acceptable salts. Thus, there can be employed organic and inorganic acids, such as, for example, aliphatic, alicyclic, araliphatic, aromatic, or heterocyclic, mono- or polybasic carboxylic or sulfonic acids, such as for example, formic acid, acetic acid, propionic acid, pivalic acid, diethylacetic acid, oxalic acid, malonic acid, lactic acid, succinic acid, pimelic acid, fumaric acid, maleic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methanesulfonic acid, ethanedisulfonic acid, β-hydroxyethanesulfonic caid, p-toluenesulfonic acid, naphthalene-mono- and -disulfonic acid, sulfuric acid, nitric acid, hydrohalic acids, such as hydrocholoric acid or hydrobromic acid, or phosphoric acids, such as orthophosphoric acid.

The free bases of Formula I can be obtained, if desired, from the salts thereof by treatment with strong bases, such as sodium or potassium hydroxide or carbonate.

Referring now to Formula I, there are provided in accordance with this invention certain preferred subgeneric groups of compounds and acid addition salts thereof as follows:

(A) Compounds of Formula I, wherein R is alkyl of 1–4 carbon atoms;

(B) Compounds of Formula I, wherein R is hydrogen;

(C) Compounds of Formula I, wherein R is alkyl of 1–4 carbon atoms; and wherein

Ar represents phenyl,
    o-, m, or p-tolyl,
    o-, m-, or p-ethylphenyl,
    o-, m-, or p-methoxyphenyl,
    o-, m-, or p-trifluoromethylphenyl,
    o-, m-, or p-fluorophenyl,
    o-, m-, or p-chlorophenyl,
    o-, m-, or p-bromophenyl, or
    o-, m-, or p-iodophenyl; and (D) Compounds of Formula I, wherein R represents methyl and wherein Ar represents phenyl, o-, m-, or p-tolyl, or o-, m-, or p-chlorophenyl.

The novel compounds can be employed with conventional pharmaceutical excipients. Suitable carriers are such organic or inorganic compounds amenable to parenteral, enteral, or topical application and which do not react with the novel compounds, such as, for example, water, vegetable oils, polyethylene glycols, gelation, lactose, amylose, magnesium stearate, talc, vaseline, cholesterol, etc. For parenteral application, particularly preferred are solutions, preferably oily or aqueous solutions, as well as suspensions or emulsions.

For enteral application, furthermore, suitable are tablets or dragees which are also characterized by the presence of a carbohydrate carrier or binder. A syrup or the like can also be used wherein a sweetened vehicle is employed.

For topical application salves or creams are used which can, if desired, be sterilized or mixed with auxiliary substances, such as preservatives, stabilizers, or wetting agents, on salts for influencing the osmotic pressure, or with buffer substances.

The substances of this invention are preferably administered to mammals in dosages of 2 to 100 mg. per dosage unit, the dosage to weight ratio being about 0.02–2 mg./kg. Generally, the amount of carrier per dosage unit is about 1–5,000 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

7.2 g. 3-(2-chloroethyl)-5-methyl-pyrazole and 19.6 g. N-(m-chlorophenyl)-piperazine are mixed and heated for two hours to 120–130° C. After cooling, the reaction mixture is triturated with cold aqueous ammonia and extracted with benzene. The residue from the extraction is freed of excess N-(m-chlorophenyl)piperazine by distillation. The residue is filtered over silica gel (elution agent: acetone:benzene:chloroform:methanol 4:4:2:1), and the thus-obtained crude base is converted into the hydrochloride. There are obtained 8 g. 3-[2-(N'-m-chlorophenyl-piperazino)-ethyl]-5-methyl-pyrazole dihydrochloride, M.P. 238–240° C. (from ethanol). The trisulfate melts at 198–200° C.

Analogously, the following compounds are obtainable:

3-[2-(N'-phenyl-piperazino)-ethyl]-5-methyl-pyrazole, dihydrochloride-hydrate, M.P. 174–176° C.;
3 - [2-(N'-o-chlorophenyl-piperazino)-ethyl]-5-methyl-pyrazole, dihydrochloride, M.P. 216–218° C.;
3 - [2-(N'-p-chlorophenyl-piperazino)-ethyl]-5-methyl-pyrazole, trihydrochloride, M.P. 218–220° C.;
3 - [2-(N'-m-trifluoromethylphenyl-piperazino)-ethyl]-5-methyl-pyrazole, trihydrochloride, M.P. 231–233° C.;
3 - [2 - (N'-m-tolyl-piperazino)-ethyl]-5-methyl-pyrazole, trihydrochloride-dihydrate, M.P. 234–236° C.;
3-[2-(N'-p-tolyl-piperazino)-ethyl]-5-methyl-pyrazole, trihydrochloride-dihydrate, M.P. 226–228° C.;
3-[2-(N'-m-tert.-butylphenyl-piperazino)-ethyl]-5-methyl-pyrazole, trihydrochloride, M.P. 231–233° C.;
3 - [2-(N'-p-methoxyphenyl-piperazino)-ethyl]-5-methyl-pyrazole, trihydrochloride-hydrate, M.P. 250–252° C.;

and from 3-(3-chloropropyl)-5-methyl-pyrazole:

3 - [3-(N'-m-chlorophenyl-piperazino)-propyl]-5-methyl-pyrazole, trihydrochloride-hydrate, M.P. 158–160° C.;
3 - [3 - (N'-o-chlorophenyl-piperazino)-propyl]-5-methyl-pyrazole, dihydrochloride-hydrate, M.P. 152–154° C.

EXAMPLE 2

At 100–110° C., 14.4 g. 3-(2-chloroethyl)-5-methyl-pyrazole and 16.2 g. N-phenyl-piperazine are stirred for 20 hours in 200 ml. butanol in the presence of 15.2 g. anhydrous potassium carbonate. After cooling, the reaction mixture is filtered off from the precipitated salts, and the filtrate is evaporated under vacuum. The residue is treated in a small amount of butanol with ethereal hydrochloric acid; after heating for a short period, the reaction solution is filtered off from the resins which separate and allowed to cool. There are obtained 10 g. 3-[2-(N'-phenyl-piperazino)-ethyl]-5-methyl-pyrazole dihydrochloride-hydrate, M.P. 174–176° C. (from ethanol).

EXAMPLE 3

7.2 g. 3-(2-chloroethyl)-5-methyl-pyrazole and 16.2 g. N-phenyl-piperazine are boiled for 12 hours in 75 ml. toluene. After cooling, the N-phenyl-piperazine hydrochloride which has crystallized is vacuum-filtered; the filtrate is concentrated by evaporation, and the residue is purified by way of the hydrochloride. There are obtained 9 g. 3-[2-(N'-phenyl-piperazino)-ethyl]-5-methyl-pyrazole-dihydrochloride-hydrate, M.P. 174–176° C. (from ethanol).

EXAMPLE 4

There are boiled in a mixture of 800 ml. acetone and 800 ml. water for 24 hours 25.3 g. m-chlorophenyl-bis-(2-chloroethyl)-amine and 42 g. 3-(2-aminoethyl)-5-methyl-pyrazole (obtained by reacting 3-(2-chloroethyl)-5-methyl-pyrazole with phthalimide-potassium and hydrolysis). Thereafter, the acetone is withdrawn under vacuum, the aqueous mixture is made alkaline with sodium hydroxide solution, and extracted with benzene. The residue from the benzenic phase is converted, with ethereal hydrochloric acid, into 3-[2-(N'-m-chlorophenyl-piperazino)-ethyl]-5-methyl-pyrazole dihydrochloride, M.P. 238–240° C.

EXAMPLE 5

In a mixture of 300 ml. acetone and 300 ml. water, 10 g. [2 - (5-methylpyrazolyl-3)-ethyl]-bis-(2-chloroethyl)-amine and 10.6 g. aniline are boiled for 24 hours. Thereafter, the reaction mixture is concentrated, made alkaline with sodium hydroxide solution, and extracted with benzene. From the benzene extract, after drying and removal of the solvent, there is obtained the 3-[2-(N'-phenyl-piperazino)-ethyl]-5-methyl-pyrazole; dihydrochloride-hydrate, M.P. 174–176° C.

EXAMPLE 6

20.9 g. 3-(3-morpholinopropyl)-5-methyl-pyrazole and 13.7 g. m-chloroaniline are dissolved in 20 ml. concentrated hydrochloric acid. The solution is evaporated to dryness under a vacuum, and the residue is then heated for 4 hours to 230–240° C., the water which forms being distilled off. After cooling, the reaction mixture is mixed with sodium hydroxide solution and extracted with benzene. Upon removal of the solvent, there is obtained the 3 - [3-(N'-m-chlorophenyl-piperazino)-propyl]-5-methyl-pyrazole; trihydrochloride-hydrate, M.P. 158–160° C.

EXAMPLE 7

In 500 ml. boiling xylene, in the presence of 2.1 g. ethylene bromide and 25 g. anhydrous powdered sodium carbonate, there are stirred for 10 hours 2.2 g. 3-(2-anilino-ethylaminomethyl)-pyrazole (obtainable by reacting 1-benzyl-3-formyl-pyrazole with N-phenylethylenediamine, hydrogenating the thus-obtained Schiff base on platinum oxide in ethanol to 1-benzyl-3-(2-anilinoethylaminomethyl)-pyrazole, and reductive splitting of the benzyl group with sodium in liquid ammonia). After the reaction product has been worked up by chromatography, 3-(N'-phenyl-piperazino-methyl)-pyrazole is obtained.

EXAMPLE 8

A solution of 6 g. 1-(N'-phenyl-piperazino)-pentane-dione-(2,4), obtained by reacting 1-phenyl-piperazine with 1-chloropentanedione-(2,4), in 40 ml. ethanol is added dropwise, under stirring, to a solution of 10 g. hydrazine hydrate in 60 ml. ethanol. Thereafter, the reaction solution is heated for one hour under reflux, then concentrated by evaporation, and sodium hydroxide solution and benzene are added; the reaction mixture is then separated and, after the benzene has been removed by evaporation, there is obtained 3-(N'-phenyl-piperazino-methyl)-5-methyl-pyrazole, M.P. 146–147° C. Monohydrochloride-hydrate, M.P. 200° C.

EXAMPLE 9

With the addition of 0.5 g. 5% palladium charcoal catalyst, 3 g. 3-[2-(N'-p-chlorophenyl-piperazino)-ethyl]-5-methyl-pyrazole in 40 ml. methanol are hydrogenated at normal pressure and a temperature of 55° C. until the reaction is terminated. The reaction mixture is allowed to cool, vacuum-filtered from the catalyst, the solution concentrated, and the residue mixed with ethereal hydrochloric acid. After recrystallization from ethanol, 2.9 g. 3 - [2-(N'-phenyl-piperazino)-ethyl]-5-methyl-pyrazole dihydrochloride-hydrate are obtained, M.P. 174–176° C.

EXAMPLE 10

In small pieces, 1 g. sodium is added to a fine suspension of 7.1 g. 1-benzyl-3-(N'-phenyl-piperazinomethyl)- pyrazole in 65 ml. liquid ammonia. There are added 3 g. ammonium chloride, and the ammonia is allowed to evaporate. The residue is mixed with a small amount of water and extracted with chloroform. The chloroform residue is recrystallized from ether, thus obtaining 3-(N'-phenyl-piperazinomethyl)-pyrazole.

The starting material is produced as follows:

(a) 18.8 g. 1-benzyl-3-hydroxymethyl-pyrazole are dissolved in 50 ml. chloroform and mixed in batches with 15 ml. thionyl chloride. The mixture is boiled for 10 minutes and then concentrated by evaporation. The residue is mixed with 37 g. N-phenyl-piperazine and heated for 1 hour to 120–130° C. After cooling, the mixture is triturated with aqueous ammonia and extracted with benzene. The extraction residue is freed of excess N-phenyl-piperazine. The base which remains is purified by way of the hydrochloride. There is obtained 1-benzyl-3-(N'-phenyl-piperazinomethyl)-pyrazole.

(b) Under stirring and cooling, 22 g. crude 1-benzyl-pyrazolyl-3-carboxylic acid chloride in 100 ml. absolute ether are added dropwise to a solution of 16.2 g. N-phenyl-piperazine and 11 g. triethylamine in 500 ml. absolute ether. After the reaction is terminated, the reaction mixture is shaken with water, and the organic phase is separated after mixing with benzene, dried, and concentrated by evaporation. The acid amide is dried, dissolved in 200 ml. absolute tetrahydrofuran, and the solution is added dropwise, with stirring and introduction of absolute nitrogen, to a suspension of 5 g. lithium aluminum hydride in 250 ml. absolute ether. The reaction mixture is boiled for 20 hours. After working up as usual and purification by chromatography, there is obtained 1-benzyl-3-(N'-phenyl-piperazinomethyl)-pyrazole.

EXAMPLE 11

Analogously to Example 8, 1-benzyl-3-[4-(N'-phenyl-piperazino)-butyl]-5-methyl-pyrazole is split with sodium in liquid ammonia to 3-[4-(N'-phenyl-piperazino)-butyl]-5-methyl-pyrazole.

The starting material is produced as follows:

The Grignard compound is obtained from 11.9 g. N-phenyl-N'-(3-chloropropyl)-piperazine and 1.3 g. magnesium in 100 ml. absolute ether. A solution of 9.3 g. 1-benzyl-3-formyl-5-methyl-pyrazole in 100 ml. absolute ether is added dropwise to this reaction mixture. After stirring for one hour, the mixture is decomposed by adding ice and dilute hydrochloric acid, made alkaline with aqueous ammonia, and the ethereal solution is separated, dried, and concentrated by evaporation. The crude residue, consisting of (1-benzyl-5-methyl-pyrazolyl-3-)-[3-(N'-phenyl-piperazino)-propyl]-carbinol, in addition to a small amount of 1-(1-benzyl-5-methyl-pyrazolyl-3)-4-(N'-phenyl-piperazinyl)-butene, is hydrogenated in ethanol in the presence of 5% palladium charcoal under normal pressure. The reaction mixture is worked up in the usual manner, thus obtaining 1-benzyl-3-[4-(N'-phenyl-piperazino)-butyl]-5-methyl-pyrazole.

EXAMPLE 12

There are added dropwise 7.2 g. 5-methyl-pyrazole-3-carboxylic acid-N'-(o-chlorophenyl)-piperazide in 75 ml. absolute tetrahydrofuran to a suspension of 4.5 g. lithium aluminum hydride in 150 ml. absolute tetrahydrofuran. The mixture is boiled for 20 hours. After adding 70 ml. ethyl acetate, 4.5 ml. water, 45 ml. 15% solution of sodium hydroxide, and again 13.5 ml. water, the inorganic precipitate is vacuum-filtered and washed with ether. The filtrate is concentrated by evaporation, there being obtained 6.5 g. of oily 3-(N'-o-chlorophenyl-piperazinomethyl)-5-methyl-pyrazole. The dihydrochloride melts at 225–227° C.

The starting material is obtained as follows:

For one hour, 4.2 g. 5-methyl-pyrazole-3-carboxylic acid anhydride (produced from 5-methyl-pyrazole-3-carboxylic acid by treatment with thionyl chloride) and 8 g. N-(o-chlorophenyl)-piperazine are heated to 90–100° C. The melt solidifies during heating. Thereafter, the reaction mixture is mixed with ethanol, boiled, vacuum-filtered after cooling, and washed with cold ethanol. There are obtained 7.2 g. 5-methyl-pyrazole-3-carboxylic acid-N'-(o-chlorophenyl)-piperazide, M.P. 194–197° C.

Analogously, the following compounds are obtained:

From 5-methyl-pyrazole-3-carboxylic acid-N'-(m-chlorophenyl)-piperazide (M.P. 145–147° C.):

3 - (N' - m - chlorophenyl-piperazinomethyl)-5-methyl-pyrazole, trihydrochloride ethanol solvate, M.P. 190–194° C. (decomposition);

From 5-methyl-pyrazole-3-carboxylic acid-N'-(p-chlorophenyl)-piperazide (M.P. 152–154° C.):

3 - (N' - p-chlorophenyl-piperazinomethyl)-5-methyl-pyrazole, M.P. 138–140° C.; dihydrochloride, M.P. 193–195° C.;

From 5-methyl-pyrazole-3-carboxylic acid-N'-(p-tolyl)-piperazide (M.P. 175–176° C.):

3-(N'-p-tolyl-piperazinomethyl)-5-pyrazole, M.P. 140–142° C.; trihydrochloride, M.P. 195–197° C.;

From 5-methyl-pyrazole-3-carboxylic acid-N'-(p-methoxyphenyl)-piperazide:

3 - [N'-(p-methoxyphenyl)-piperazinomethyl]-5-methyl-pyrazole, M.P. 156–157° C.; trihydrochloride, M.P. 218–219° C.;

From 5-methyl-pyrazole-3-carboxylic acid-N'-(m-trifluoromethylphenyl)-piperazide (M.P. 198–200° C.):

3 - [N'-(m-trifluoromethylphenyl)-piperazinomethyl]-5-methyl-pyrazole, trihydrochloride-hydrate, M.P. 159–162° C.;

From 5-methyl-pyrazole-3-carboxylic acid-N'-(m-tolyl)-piperazide (M.P. 130–132° C.):

3 - [N'-(m-tolyl)-piperazinomethyl]-5-methyl-pyrazole, dihydrochloride, M.P. 214–217° C.

EXAMPLE 13

Analogously to Example 1, the following compounds are obtainable from the basic compounds 3-(ω-chloroalkyl)-pyrazoles and N-aryl-piperazines:

3-[2-(N'-phenyl-piperazino)-ethyl]-pyrazole;
3-[3-(N'-phenyl-piperazino)-propyl]-pyrazole;
3-[4-(N'-phenyl-piperazino)-butyl]-pyrazole;

as well as the following 5-methyl-pyrazoles:

3-[2-(N'-o-tolyl-piperazino)-ethyl]-;
3-[2-(N'-o-tert.-butylphenyl-piperazino)-ethyl]-;
3-[2-(N'-p-tert.-butylphenyl-piperazino)-ethyl]-;
3-[2-(N'-o-methoxyphenyl-piperazino)-ethyl]-;
3-[2-(N'-m-methoxyphenyl-piperazino)-ethyl]-;
3-[2-(N'-o-trifluoromethylphenyl-piperazino)-ethyl]-;
3-[2-(N'-p-trifluoromethylphenyl-piperazino)-ethyl]-;
3-[2-(N'-o-fluorophenyl-piperazino)-ethyl]-;
3-[2-(N'-m-fluorophenyl-piperazino)-ethyl]-;
3-[2-(N'-p-fluorophenyl-piperazine-ethyl]-;
3-[2-(N'-o-bromophenyl-piperazino)-ethyl]-;
3-[2-(N'-m-bromophenyl-piperazine)-ethyl]-;
3-[2-(N'-p-bromophenyl-piperazino)-ethyl]-;
3-[2-(N'-o-iodophenyl-piperazino)-ethyl]-;
3-[2-(N'-m-iodophenyl-piperazino)-ethyl]-;
3-[2-(N'-p-iodophenyl-piperazino)-ethyl]-;
3-[3-(N'-phenyl-piperazino)-propyl]-;
3-[3-(N'-p-chlorophenyl-piperazino)-propyl]-;
3-[4-(N'-phenyl-piperazino)-butyl]-;
3-[4-(N'-o-chlorophenyl-piperazino)-butyl]-;
3-[4-(N'-m-chlorophenyl-piperazino)-butyl]-;
3-[4-(N'-p-chlorophenyl-piperazino-butyl]-;

and the following 5-ethyl-pyrazoles:

3-(N'-phenyl-piperazinomethyl)-;
3-(N'-o-chlorophenyl-piperazinomethyl)-;
3-(N'-m-chlorophenyl-piperazinomethyl)-;
3-(N'-chlorophenyl-piperazinomethyl)-;
3-[2-(N'-phenyl-piperazino)-ethyl]-;
3-[2-(N'-o-chlorophenyl-piperazino)-ethyl]-;

3-[2-(N'-p-chlorophenyl-piperazino)-ethyl]-;
3-[3-(N'-phenyl-piperazino)-propyl]-;
3-[3-(N'-o-chlorophenyl-piperazino)-propyl]-;
3-[3-(N'-m-chlorophenyl-piperazino)-propyl]-;
3-[3-(N'-p-chlorophenyl-piperazino)-propyl]-;
3-[4-(N'-phenyl-piperazino)butyl]-;
3-[4-(N'-o-chlorophenyl-piperazino)-butyl]-;
3-[4-(N'-m-chlorophenyl-piperazino)butyl]-; and
3-[4-(N'-p-chlorophenyl-piperazino-butyl]-
5-ethyl-pyrazole.

The following examples cover suitable pharmaceutical compositions which can be prepared according to conventional procedures.

EXAMPLE A.—TABLETS

|  | Mg. |
|---|---|
| 3 - [2 - (N' - m - chlorophenyl - piperazino) - ethyl]-5-methyl-pyrazole-dihydrochloride | 0.7 |
| Sodium chloride | 50 |
| Bole | 30 |
| Talc | 10 |
| Gelatin | 4.3 |
| Highly dispersed silicic acid | 5 |

EXAMPLE B.—COATED TABLETS

|  | Mg. |
|---|---|
| 3 - [2 - (N'-m-chlorophenyl-piperazino) - ethyl]-5-methyl-pyrazole-dihydrochloride | 0.5 |
| Lactose | 94.5 |
| Talc | 5 |

The coating consists of a mixture of cane sugar, talc, corn starch, and tragacanth. Its weight is about 100 mg.

EXAMPLE C.—SOLUTION FOR INJECTION

A solution of 350 g. of 3-[2-(N'-m-chlorophenyl-piperazino)-ethyl]-5-methyl-pyrazole-dihydrochloride in 1000 l. of distilled water is prepared and filled into ampoules in such a manner that each ampoule contains 0.35 mg. of the dihydrochloride.

In place of the cited dihydrochloride, it is also possible to incorporate other physiologically compatible acid addition salts of the base as well as other compounds embraced by Formula I or their physiologically compatible acid addition salts into similar preparations.

The proceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A compound selected from the group consisting of a 3-(piperazinoalkyl)-pyrazole of the following formula and a physiologically acceptable acid addition salt thereof:

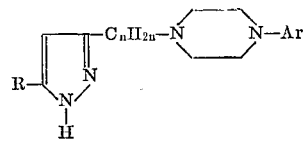

wherein
R is methyl;
Ar is unsubstituted phenyl, or phenyl substituted by a member selected from the group consisting of alkyl of 1–4 carbon atoms, alkoxy of 1–4 carbon atoms, trifluoromethyl, and halogen;
$n$ is an integer of 1 to 4 inclusive.

2. A compound as defined by claim 1 wherein Ar is phenyl,
o-, m-, or p-tolyl,
o-, m-, or p-ethylphenyl,
o-, m-, or p-methoxyphenyl,
o-, m-, or p-trifluoromethylphenyl,
o-, m-, or p-fluorophenyl,
o-, m-, or p-chlorophenyl,
o-, m-, or p-bromophenyl, or
o-, m-, or p-iodophenyl.

3. A compound as defined by claim 1 wherein R is methyl, and Ar is phenyl,
o-, m-, or p-tolyl, or
o-, m-, or p-chlorophenyl.

4. A compound as defined by claim 1 wherein said 3-(piperazinoalkyl)-pyrazole is 3-[2-(N'-m-tolylpiperazino)-ethyl]-5-methyl-pyrazole.

5. A compound as defined by claim 1 wherein said 3-(piperazionalkyl)-pyrazole is 3-[2-(N'-m-chlorophenyl-piperazino)-ethyl]-5-methyl-pyrazole.

References Cited

UNITED STATES PATENTS

| 2,329,680 | 7/1967 | Hofmann et al. | 260—268 |
| 2,562,036 | 7/1951 | Hultquist et al. | 260—268 X |
| 3,367,936 | 2/1968 | Koppe et al. | 260—268 |

DONALD G. DAUS, Primary Examiner

U.S. Cl. X.R.

260—310; 690; 424—250